United States Patent
Chen et al.

(10) Patent No.: US 8,280,940 B2
(45) Date of Patent: Oct. 2, 2012

(54) DATA PROCESSING APPARATUS WITH SHADOW REGISTER AND METHOD THEREOF

(75) Inventors: Chun-Yu Chen, Sinshih Township, Tainan County (TW); Shu-Ming Liu, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 874 days.

(21) Appl. No.: 11/976,139

(22) Filed: Oct. 22, 2007

(65) Prior Publication Data

US 2009/0106489 A1 Apr. 23, 2009

(51) Int. Cl.
*G06F 7/38* (2006.01)
*G06F 15/00* (2006.01)

(52) U.S. Cl. ........................ 708/523; 708/603
(58) Field of Classification Search .................. 708/200, 708/490, 495, 320, 523, 603; 711/110, 214; 712/23, 225
See application file for complete search history.

(56) References Cited

U.S. PATENT DOCUMENTS

| | | | | |
|---|---|---|---|---|
| 4,561,065 A | * | 12/1985 | Matsuda | 708/320 |
| 4,969,118 A | * | 11/1990 | Montoye et al. | 708/501 |
| 5,438,532 A | * | 8/1995 | Nagao et al. | 708/319 |
| 5,826,072 A | * | 10/1998 | Knapp et al. | 712/226 |
| 5,978,825 A | * | 11/1999 | Divine et al. | 708/525 |
| 5,996,070 A | * | 11/1999 | Yamada et al. | 712/236 |
| 6,311,261 B1 | * | 10/2001 | Chamdani et al. | 712/23 |
| 6,826,679 B1 | * | 11/2004 | Laurenti et al. | 712/225 |
| 7,353,364 B1 | * | 4/2008 | Chong et al. | 712/E9.046 |
| 7,472,051 B2 | * | 12/2008 | Mariani et al. | 708/513 |
| 2002/0184275 A1 | * | 12/2002 | Dutta et al. | 708/300 |
| 2004/0143613 A1 | * | 7/2004 | Clemen et al. | 708/233 |
| 2005/0076073 A1 | * | 4/2005 | Gurrapu | 708/300 |

OTHER PUBLICATIONS

Montoye et al., Design of the IBM RISC System/6000 Floating-point Execution Unit, IBM Journal of R&D, vol. 34, Issue 1, 1990, abstract, p. 1.*

* cited by examiner

*Primary Examiner* — Chuong D Ngo
(74) *Attorney, Agent, or Firm* — Rabin & Berdo, P.C.

(57) ABSTRACT

A data processing apparatus including a register bank, a shadow register and an arithmetic operation unit. The register bank includes a number of registers respectively for storing a number of operands wherein the registers are n-bit registers, and n is a nature number. The shadow register stores a first backup operand for making a backup of a first operand, which is stored in a first one of the registers in response to first control signal. The arithmetic operation unit performs at least an arithmetic operation on the operands to obtain operational data, and stores the operational data in the first register in response to an arithmetic operation command.

6 Claims, 5 Drawing Sheets

DATA PROCESSING APPARATUS WITH SHADOW REGISTER AND METHOD THEREOF

BACKGROUND OF THE INVENTION

1. Field of the Invention

The invention relates in general to a data processing apparatus and method thereof, and more particularly to a data processing apparatus and method thereof capable of reducing the number of registers used in the multiply-accumulate (MLA) operation.

2. Description of the Related Art

Along with increasing development of technology, data processing apparatus, such as micro processor, has been wildly used in different of application aspects, such as the micro processor capable of carrying out the multiply-accumulate (MLA) operation.

Referring to FIG. 1, a block diagram of a conventional data processing apparatus is shown. In the conventional micro processor 100, registers Re1 to Re4 in a register bank 120 are used for storing data Pa, Pb, Pc, and operation data Pd, respectively, wherein the operation data Pd satisfied the equation: Pd=Pa×Pb+Pc. However, four registers Re1 to Re4 must be used to carry out the MLA operation in the conventional micro processor. Therefore, how to design a data processing apparatus to reduce the number of registers used in MLA operation is one of the efforts the industries are making.

SUMMARY OF THE INVENTION

The invention is directed to a data processing apparatus and method thereof, which can resolve the problem of four registers are needed in the conventional data processing apparatus in a multiply-accumulate (MLA) operation. The data processing apparatus and method of the invention have the advantage of reducing the number of registers used in the MLA operation.

According to a first aspect of the present invention, a data processing apparatus is provided. The data processing apparatus comprises a register bank, a shadow register and an arithmetic operation unit. The register bank comprises a number of registers for respectively storing a number of operands, respectively. The registers are n-bit registers, and n is a nature number. The shadow register is for storing first backup operand for making a backup of a first operand, which is stored in a first register among the registers in response to first control signal. The arithmetic operation unit is for performing at least an arithmetic operation among the operands to obtain an operational data, and storing the operational data in the first register in response to an arithmetic operation command.

According to a second aspect of the invention, a data processing method is provided. The data processing method comprises the following steps. First, a register bank including a plurality of registers for respectively storing a plurality of operands is provided. Next, a first backup operand is stored for making a backup of a first operand among the operands in response to a first control signal. The first operand is stored in a first register among the registers. Then, at least an arithmetic operation is performed on the operands to obtain an operational data in response to an arithmetic operation command. After that, the operational data is stored in the first register.

The data processing method comprises: provide a register bank comprising first, second and third register for respectively storing first, second and third operand; store first backup operand for making a backup of the third operand in response to first control signal; multiply the first and the second operand and adding a product of the first and the second operand and the third operand to obtain a operational data in response to a MLA command; and store the operational data in the third register.

The invention will become apparent from the following detailed description of the preferred but non-limiting embodiments. The following description is made with reference to the accompanying drawings.

DETAILED DESCRIPTION OF THE INVENTION

First Embodiment

Figure 2:
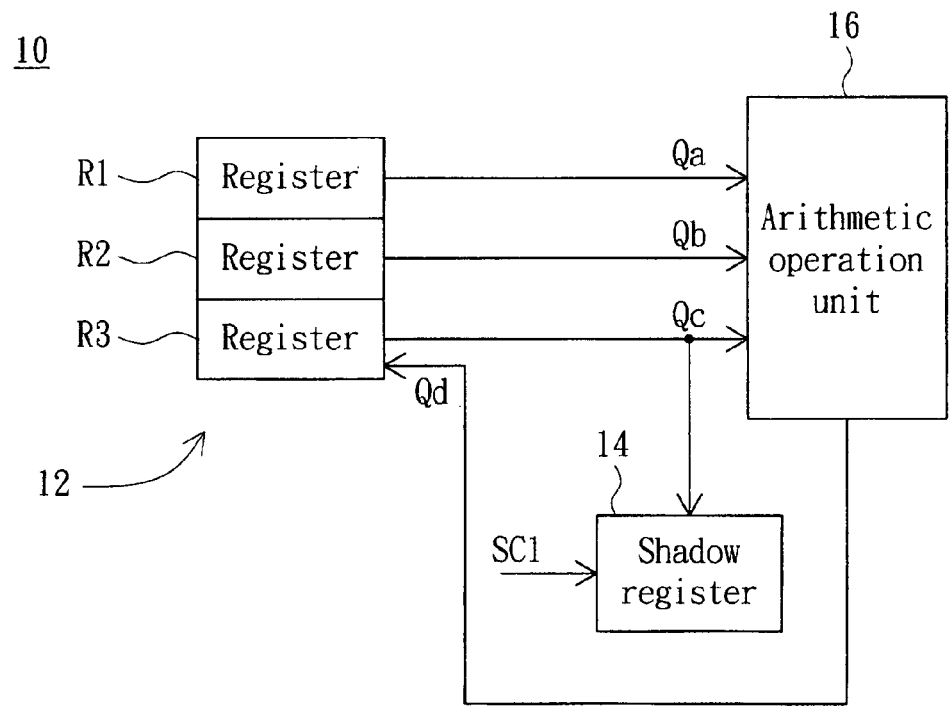
FIG. 2 is a block diagram of a data processing apparatus according to a first embodiment of the invention.

Referring to FIG. 2, a block diagram of a data processing apparatus according to a first embodiment of the invention is shown. A data processing apparatus 10 includes a register bank 12, a shadow register 14, and an arithmetic operation unit 16. The register bank 12 includes a number of registers respectively for storing a number of operands. The shadow register 14 stores a first backup operand for making a backup of a first operand among the operands in response to a first control signal. The first operand is stored in a first register among the registers R1 to R3. The arithmetic operation unit 16 performs at least an arithmetic operation on the operands stored in the registers R1 to R3 to obtain an operational data Qd and storing the operational data Qd in the first register in response to an arithmetic operation command. To explain the operation of the data processing apparatus 10, example is cited that the arithmetic operation unit 16 is a multiply-accumulate (MLA) operation unit.

For example, the register bank 12 includes three registers R1 to R3 and the registers R1 to R3 stores operands Qa, Qb, and Qc, respectively. The registers R1 to R3 are n-bit registers, wherein n is a nature number. The MLA operation unit is for performing a multiplying-operation and an accumulating-operation on the operands Qa, Qb, and Qc. For example, the MLA operation unit performs the operation: Qd=Qa×Qh+Qc. Afterward, the MLA operation unit outputs the operational data Qd to the register R3 for completing the MLA operation. The operational data Qd is then stored in the register R3.

Before the operational data Qd is stored in the register R3, making a backup of the operand Qc is needed in order to prevent the operand Qc from being overwritten. The shadow register 14 is for storing a backup operand Qr1 (not shown in FIG. 2) for making a backup of the operand Qc in response to a control signal SC1 before the MLA operation unit stores the operational data Qd in the register R3. The backup operand Qr1 is substantially equal to the operand Qc. Therefore, the operand Qc can be effectively reserved when the operational data Qd is stored in the register R3.

Figure 3:
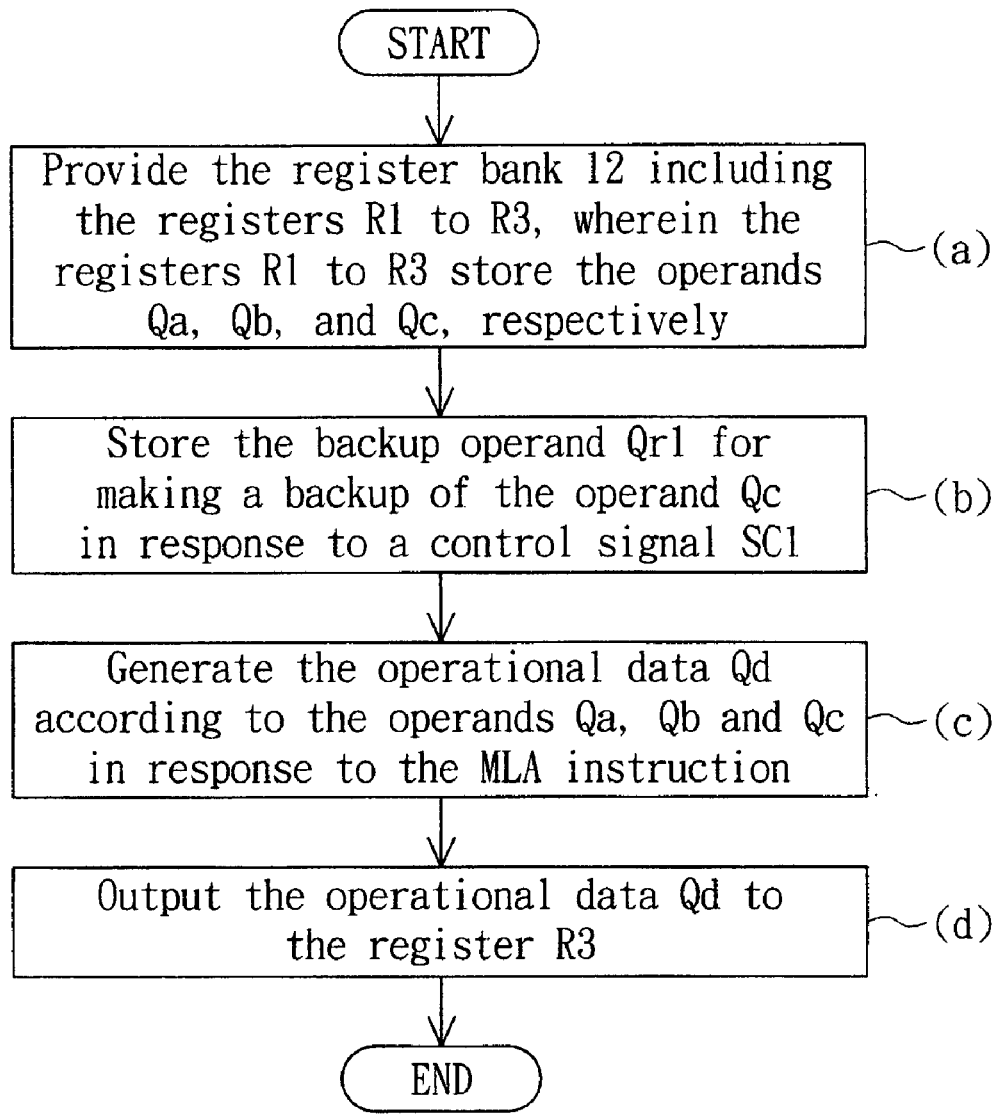
FIG. 3 is a flow chart of a data processing method according to the first embodiment of the invention.

Referring to FIG. 3, a flow chart of a data processing method according to the first embodiment of the invention is shown. Firstly, as shown in step (a), provide the register bank 12 including the registers R1 to R3, wherein the registers R1 to R3 store the operands Qa, Qb, and Qc, respectively. Next, as shown in step (b), the shadow register 14 stores the backup operand Qr1 for making a backup of the operand Qc in response to a control signal SC1.

Then, as shown in step (c), the MLA operation unit generates the operational data Qd according to the operands Qa, Qb and Qc in response to the MLA instruction. After that, as shown in step (d), the logic unit 18 outputs the operational data Qd to the register R3.

Although the arithmetic operation unit 16 is a MLA operation unit and the MLA operation unit performs the operation: $Qd=Qa\times Qb+Qc$ in the embodiment, the arithmetic operation unit 16 is not limited to be a MLA operation unit and the MLA operation unit is not limited to perform the operation mentioned above and can perform other MLA operation on the operands Qa, Qb, and Qc.

Second Embodiment

Figure 4:
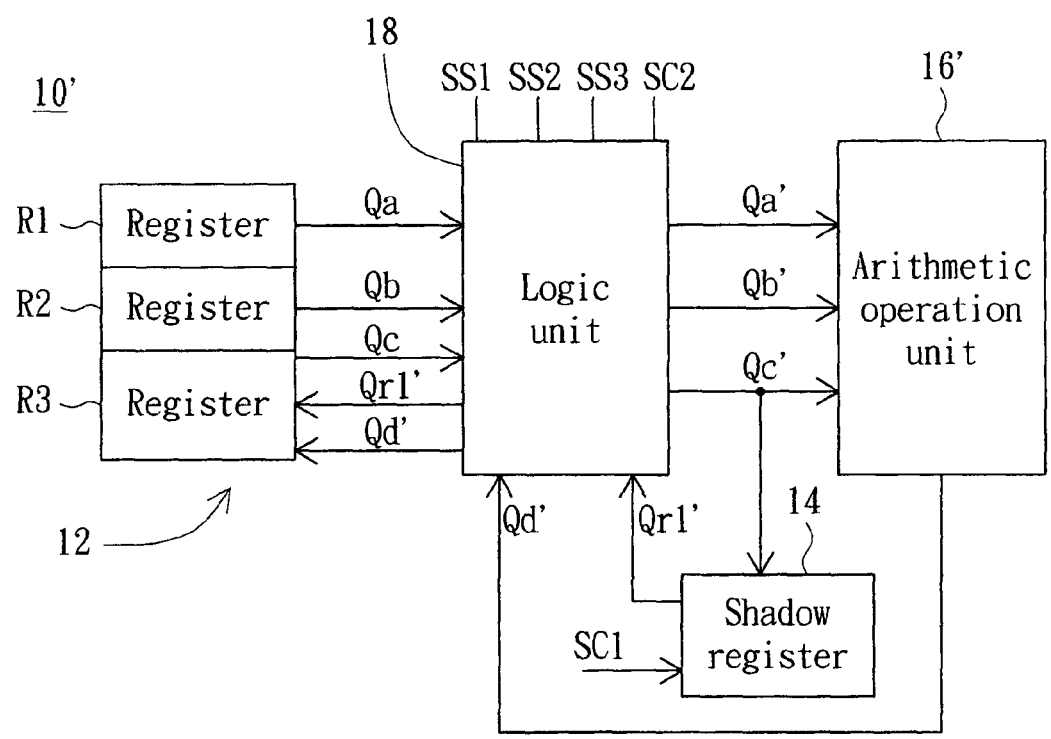
FIG. 4 is a block diagram of a data processing apparatus according to a second embodiment of the invention.

Referring to FIG. 4, a block diagram of the data processing apparatus of a second embodiment is shown. The data processing apparatus of the second embodiment mainly differs from that of the first embodiment in that the data processing apparatus 10' in FIG. 4 further includes a logic unit 18 to generate operands Qa', Qb', and Qc' based on the operands Qa, Qb, and Qc from registers R1 to R3 respectively. Another difference is that the arithmetic operation unit 16' of the data processing apparatus 10' performs the operation: $Qd'=Qa'\times Qb'+Qc'$ and output the operational data Qd'.

The logic unit 18 further receives the operational data Qd', selection signals SS1 to SS3, and control signal SC2. The logic unit 18 selects one of the operands Qa, Qb, and Qc to be the operands Qa' in response to the selection signal SS1, and selects another one of the operands Qa, Qb, and Qc to be the operands Qb' in response to selection signals SS2, and selects the other one of the operands Qa, Qb, and Qc to be the operands Qc' in response to selection signal SS3. Normally, the logic unit 18 selects the operands Qa, Qb, and Qc to be operands Qa', Qb', and Qc' respectively. After the logic unit 18 receives the operational data Qd' from the arithmetic operation unit 16', the logic unit 18 outputs the operational data Qd' to the register R3 in response to the control signal SC2. The shadow register 14 stores a backup operand Qr' for making a backup of the operand Qc' in response to the control signal SC1. Normally, the backup operand Qr1' is the operand stored in the register R3, i.e. the operand Qc.

The logic unit 18 further receives the backup operand Qr1' and determines whether the data processing apparatus 10' is going to carry out other operation with the operand Qc. When the data processing apparatus 10 is going to carry out the operation with the operand Qc, the logic unit 18 outputs the backup operand Qr1' to the register previously storing the operand Qc, which is the register R3. Therefore, the register R3 stores backup operand Qr1' which equal to the operand Qc, and the data processing apparatus 10 can then effectively access the operand Qc from the register R3 and carry out the other operation using the operand Qc.

Although the operands Qa' to Qc' are respectively equal to the operands Qa to Qc in this embodiment, the operands Qa' to Qc' are not limited to be the operands Qa to Qc and can be re-arranged by the logic unit 18 according to the selection signal SS1 to SS3. For example, the operands Qa', Qb', and Qc' can be equal to the operands Qa, Qc, and Qb respectively.

The data processing apparatus of the first and the second embodiments have the advantage of lower amount of the needed registers. By using the shadow register 14 for making the backup operand Qr1 or Qr1' corresponding to the operand Qc previously stored in register R3, and by providing the operational data Qd and Qd' obtained by carrying out the arithmetic operation with operands Qa to Qc or Qa' to Qc' to the register R3, the data processing apparatus of the first and second embodiments of the invention carries out the arithmetic operation (i.e. the MLA operation) by using only three registers. Therefore, the data processing apparatus of the first and second embodiments can effectively reduce the amount of the needed registers comparing to the conventional data processing apparatus shown in FIG. 1 which uses four registers Re1 to Re4 to carry out the MLA operation.

Third Embodiment

Figure 5:
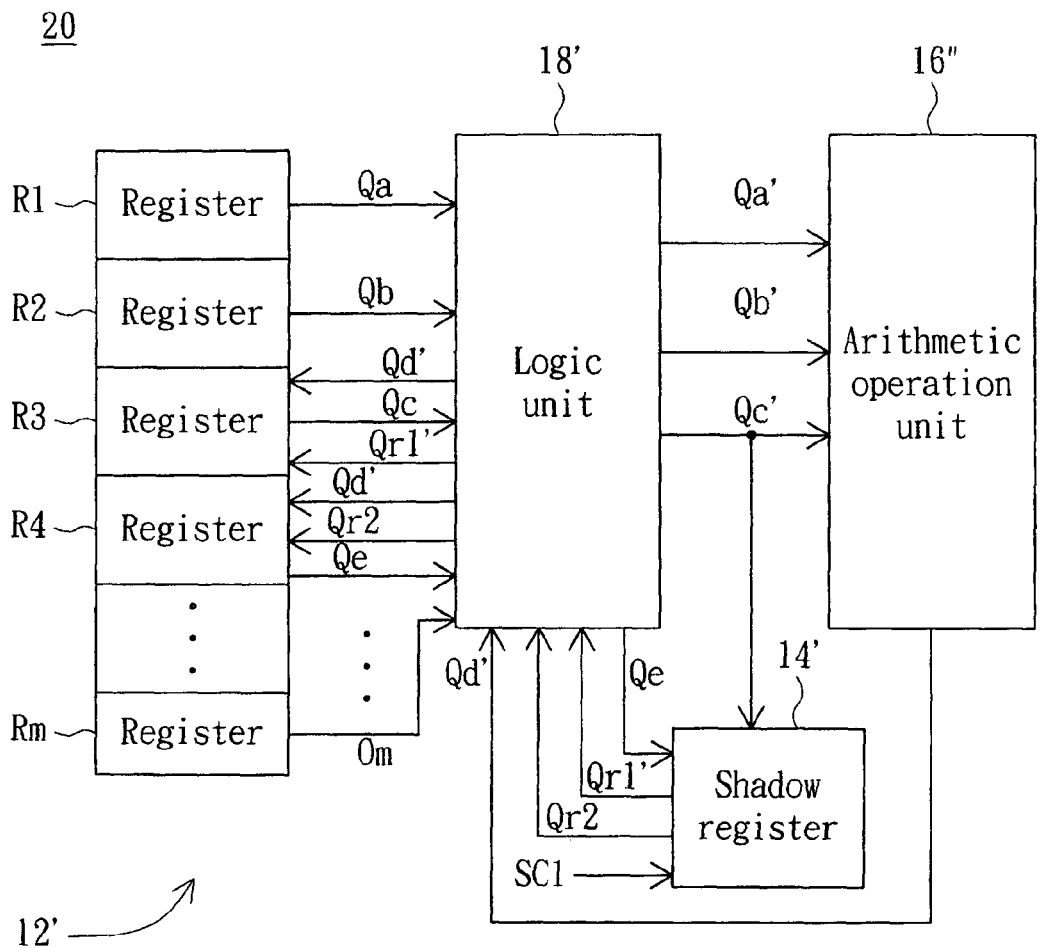
FIG. 5 is a block diagram of a data processing apparatus according to a third embodiment of the invention.

Referring to FIG. 5, a block diagram of a data processing apparatus according to a third embodiment of the invention is shown. The data processing apparatus 20 of the third embodiment mainly differs from the data processing apparatus 10' of the second embodiment in that the register bank 12' additionally includes registers R4 to Rm, wherein m is a nature number larger than 3. Another difference is that the logic unit 18' of the embodiment transfers the operational data Qd' to one of the registers R4 to Rm when the data processing apparatus 20 is going to carry out other operation using the operand Qc.

Figure 1:
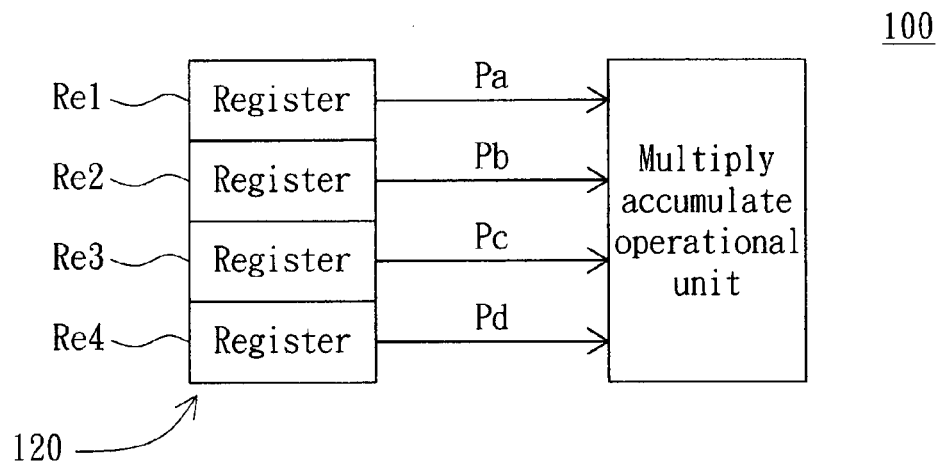
FIG. 1 is a block diagram of a conventional data processing apparatus.

For example, the logic unit 18' transfers the operational data Qd' previously stored in the register R3 to the register R4 before the logic unit 18' transfers the backup operand Qr1' stored in the shadow register 14 to the register R3. As mentioned above, the backup operand Qr1' is the operand previously stored in the register R3, i.e. the operand Qc. After that, the data stored in the registers R1 to R4 and the data stored in the register Re1 to Re4 in the conventional data processing apparatus of FIG. 1 are substantially the same. That is, after the data processing apparatus 20 performs the arithmetic operation (i.e. the MLA operation), the register R1 to R4 will stores operands Qa, Qb, and Qc, and operational data Qd' respectively, which has substantially the same register data structure as the registers Re1 to Re4 which stores storing data Pa, Pb, and Pc, and operation data Pd respectively in the conventional data processing apparatus of FIG. 1. Therefore, the data processing apparatus 20 can be controlled by a conventional instruction for the conventional data processing apparatus of FIG. 1 to access the operands Qa, Qb, and Qc and the operational data Qd' stored in the register R1 to R4.

In the operation mentioned above, the operational data Qd' will be stored in the register R4. Before the operational data Qd' is stored in the register R4, making a backup of an operand originally stored in the register R4 is necessary to prevent the operand which originally stored in the register R4 from being overwritten. For example, the operand originally stored in the register R4 is designated as Qe. Therefore, the shadow register 14' of this embodiment further stores a backup operand Qr2 which is a backup operand substantially equal to the operand Qe originally stored in the register R4 before the operational data Qd is stored in the register R4. Therefore, the operand Qe can be effectively reserved when the operational data Qd is stored in the register R4.

The logic unit 18' further receives the backup operand Qr2 and determines whether the data processing apparatus 20 is going to carry out other operation related to the operand Qe. When the data processing apparatus 20 is going to carry out the operation related to the operand Qe, the logic unit 18' transfers the backup operand Qr2 to the register previously storing the operand Qe, which is the register R4. Therefore, other operations related to the operand Qe can be further performed by the data processing apparatus 20.

Figure 6:
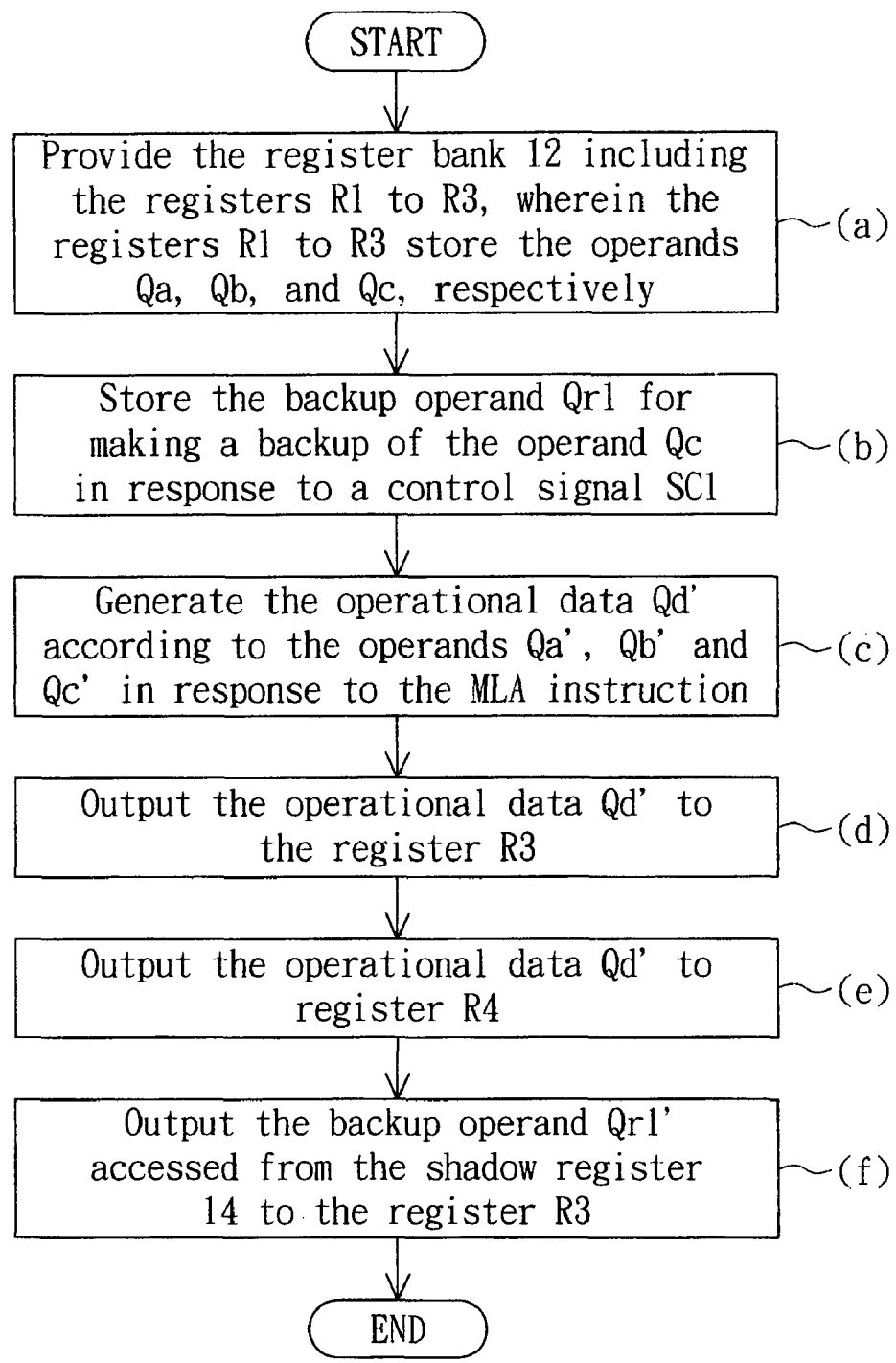
FIG. 6 is a flow chart of a data processing method according to the third embodiment of the invention.

Referring to FIG. 6, a flow chart of a data processing method according to the third embodiment of the invention is shown. The data processing method of this embodiment is different from the method according to the first embodiment in that steps (e) and (f) are included after the step (d). As shown in step (e), the logic unit 18' outputs the operational data Qd' to register R4. After that, as shown in step (f), the logic unit 18 outputs the backup operand Qr1' accessed from the shadow register 14 to the register R3.

Besides, in the data processing method of this embodiment, the steps (b) further includes that the shadow register 14' stores backup operand Qr2 for making a backup of the operand Qe in response to the control signal SC1.

The data processing apparatus of the first and the second embodiment of the invention carry out the arithmetic operation by using only three registers, which is less than the conventional micro processor. Besides, the data processing apparatus of the third embodiment of the invention and the conventional data processing apparatus in FIG. 1 have substantially the same register data structure, so that the data processing apparatus of the third embodiment has the advantage of being compatible with the control instruction of the conventional data processing apparatus.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing apparatus, comprising:
    a register bank, comprising a plurality of registers respectively for storing a plurality of operands, the registers comprising a first register, a second register and a third register, the operands comprising a first operand, a second and a third operand, wherein the registers are n-bit registers, n is a natural number, and wherein the first operand is stored in the first register, the second operand is stored in the second register, and the third operand is stored in the third register;
    a shadow register, for storing the first operand as a first backup operand in response to a first control signal; and
    an operation unit, for multiplying the second operand by the third operand and adding the result to the first operand to obtain operational data, and storing the operational data in the first register in response to an arithmetic operation command after the first operand is backed up;
    wherein the register bank further comprises a fourth register, and the data processing apparatus further comprises a logic unit for providing the operational data of the first register to the fourth register in response to a second control signal, and then providing the first backup operand stored in the shadow register to the first register.

2. The data processing apparatus according to claim 1, wherein the logic unit further provides the operands to the operation unit in response to a plurality of selection signals, respectively.

3. The data processing apparatus according to claim 1, wherein the shadow register further stores a fourth operand previously stored in the fourth register as a second backup operand in the shadow register before the operational data is provided to the fourth register.

4. The data processing apparatus according to claim 1, wherein the arithmetic operation command is a multiply-accumulate (MLA) command.

5. A data processing method, comprising:
    providing a register bank comprising a plurality of registers for respectively storing a plurality of operands, wherein the registers comprise a first register, a second register and a third register, and the operands comprise a first operand, a second operand and a third operand, and wherein the first operand is stored in the first register, the second operand is stored in the second register, and the third operand is stored in the third register;
    storing the first operand as a first backup operand in response to a first control signal;
    multiplying the second operand by the third operand and adding the result to the first operand to obtain operational data in response to an arithmetic operation command; and
    storing the operational data in the first register after the first operand is backed up;
    wherein the register bank further comprises a fourth register, and the data processing method further comprises:
    storing the operational data in the fourth register in response to a second control signal; and
    storing the first backup operand in the first register.

6. The data processing method according to claim 5, further comprising the step of storing a fourth operand previously stored in the fourth register as a second backup operand in response to the first control signal before the step of storing the operational data in the fourth register.

* * * * *